(12) United States Patent
Lane

(10) Patent No.: US 10,604,169 B1
(45) Date of Patent: Mar. 31, 2020

(54) MULTI-CONFIGURATION MECHANICAL APPARATUS

(71) Applicant: Shinn Fu Company of America, Inc., Kansas City, MO (US)

(72) Inventor: Josh Lane, Kansas City, MO (US)

(73) Assignee: SHINN FU COMPANY OF AMERICA, INC., Kansas City, MO (US)

( * ) Notice: Subject to any disclaimer, the term of this patent is extended or adjusted under 35 U.S.C. 154(b) by 0 days.

(21) Appl. No.: 16/360,990

(22) Filed: Mar. 21, 2019

(51) Int. Cl.
| | |
|---|---|
| *B62B 3/02* | (2006.01) |
| *B25H 5/00* | (2006.01) |
| *B25H 3/06* | (2006.01) |
| *A47C 13/00* | (2006.01) |
| *B62B 5/04* | (2006.01) |
| *B62B 5/00* | (2006.01) |

(52) U.S. Cl.
CPC ............... *B62B 3/02* (2013.01); *A47C 13/00* (2013.01); *B25H 3/06* (2013.01); *B25H 5/00* (2013.01); *B62B 5/04* (2013.01); *B62B 5/0013* (2013.01); *B62B 2202/42* (2013.01); *B62B 2202/48* (2013.01); *B62B 2206/06* (2013.01)

(58) Field of Classification Search
CPC .. B62B 3/02; B62B 5/04; A63C 13/00; B25H 5/00
See application file for complete search history.

(56) References Cited

U.S. PATENT DOCUMENTS

| | | | | |
|---|---|---|---|---|
| 4,715,573 A | * | 12/1987 | Liegel | ...................... B25H 5/00 |
| | | | | 248/129 |
| 5,022,670 A | * | 6/1991 | Cote | ........................ B25H 5/00 |
| | | | | 280/32.6 |
| 5,299,826 A | * | 4/1994 | Flowers | ..................... B62B 3/02 |
| | | | | 16/113.1 |
| 5,577,744 A | * | 11/1996 | Parks | ........................ B62B 3/02 |
| | | | | 280/32.6 |
| 5,863,053 A | * | 1/1999 | Berry | ....................... B25H 5/00 |
| | | | | 280/32.6 |
| 6,095,532 A | * | 8/2000 | Martin | ..................... B25H 5/00 |
| | | | | 280/30 |
| 6,669,077 B1 | * | 12/2003 | Kawashima | ......... B23K 35/007 |
| | | | | 228/180.21 |
| 9,623,551 B1 | * | 4/2017 | Bowen | ..................... A47C 1/00 |
| 9,969,215 B1 | * | 5/2018 | Whiteside | ........... B60B 33/0007 |
| 10,422,183 B2 | * | 9/2019 | Frick | ....................... E06C 1/383 |

* cited by examiner

*Primary Examiner* — John D Walters
*Assistant Examiner* — James J Triggs
(74) *Attorney, Agent, or Firm* — Christensen O'Connor Johnson Kindness PLLC

(57) ABSTRACT

A multi-configuration apparatus includes a first frame assembly positionable in a first plane and wheels secured thereto such that it is moveable along a surface, a second frame assembly moveably secured to the first frame assembly, and a third frame assembly detachably secured to the second frame assembly. The second frame assembly is moveable between at least a first configuration to move the third frame assembly into a substantially coplanar relationship with the first plane, and a second configuration to move the third frame assembly in a raised configuration relative to the first frame assembly and in a second plane that is substantially parallel to the first plane. The apparatus further includes a support secured to the third frame assembly and wheels such that the third frame assembly is moveable along a surface when the third frame assembly is detached from the second frame assembly.

20 Claims, 6 Drawing Sheets

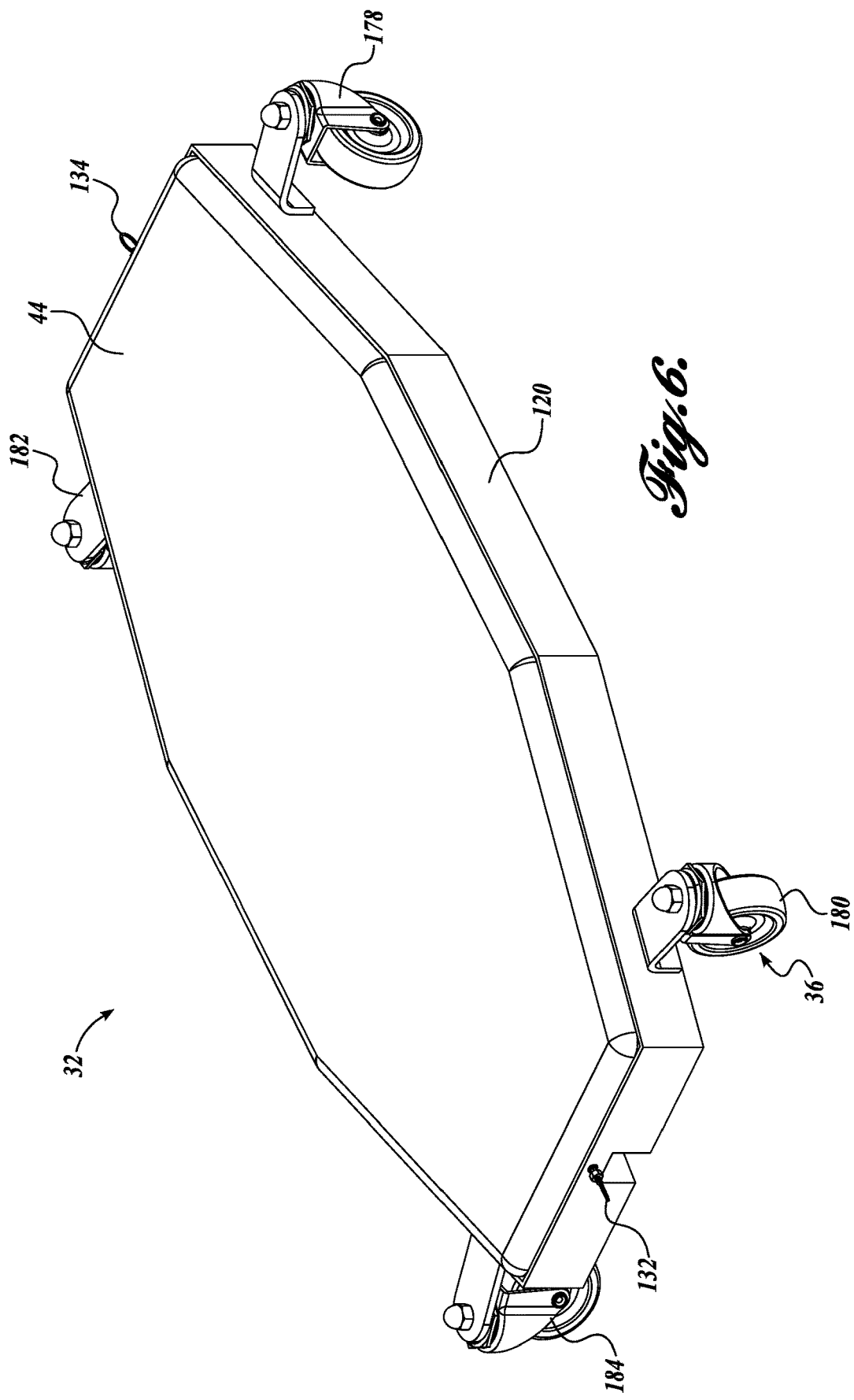

MULTI-CONFIGURATION MECHANICAL APPARATUS

BACKGROUND

In the field of auto mechanics, a mechanic is often required to work on the underside of a vehicle while performing maintenance or repair. Devices called creepers are widely used to mobilize a mechanic while working under a vehicle. Creepers generally allow the mechanic to move freely in a supine configuration and work underneath the vehicle while allowing for minimal clearance under the vehicle. In that regard, creepers generally include a flat platform mounted on wheels or casters. A tool tray may be placed on the floor while the mechanic is in the supine position.

Additionally, it is known to use work bays where vehicles may be placed on hydraulic lifts and elevated to a position above an upright mechanic. In this elevated vehicle position, the mechanic often works in a standing position. Accordingly, it is helpful to have any tools, equipment, parts, etc., readily available at table or counter height to avoid having to continuously bend down to retrieve them from the floor. At the same time, it is helpful to have such table or counter height tools, equipment, parts, etc., positionable near the mechanic, such as with a moveable table or tool tray, so that he/she does not have to continuously walk over to a permanent counter or table to retrieve them.

When considering that many automotive shops work on several cars at the same time, the redundancy in work platforms greatly increases the cost necessary to work on the automobiles. Furthermore, the work area around the automobile quickly becomes congested with the work platforms, tools, equipment, parts, etc. Accordingly, depending on the work activity, the creeper, floor tool tray, standing tool tray, etc., is not being utilized and merely takes up space around the work area, making it more difficult for an orderly work place to be maintained by the mechanic.

Creepers have been developed which allow the flat platform of the creeper to be transformed into different configurations, such as a "rolling seat" for working around the vehicle's exterior, rather than just underneath the vehicle's chassis. Such a mechanic's creeper thus provides two separate work platforms for the mechanic, instead of one, which can decrease the expense and congestion in maintaining two separate creepers. Additionally, these mechanic's creepers are usually foldable, thus allowing the creeper to be into collapsed into a compact closed configuration which can be easily stored around the work area.

The apparatus of the present disclosure provides the mechanic with an easily transformable mechanic's creeper that can be moved into various configurations with minimal effort and that can be folded flat for storage.

SUMMARY

A multi-configuration apparatus includes a first frame assembly positionable in a first plane, wheels secured to the first frame assembly such that the first frame assembly is moveable along a surface, a second frame assembly moveably secured to the first frame assembly, and a third frame assembly detachably secured to the second frame assembly. The second frame assembly is moveable between at least a first configuration to move the third frame assembly into a substantially coplanar relationship with the first plane, and a second configuration to move the third frame assembly in a raised configuration relative to the first frame assembly and in a second plane that is substantially parallel to the first plane. The apparatus further includes a support secured to the third frame assembly and wheels secured to the third frame assembly such that the third frame assembly is moveable along a surface when the third frame assembly is detached from the second frame assembly.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is an isometric view of a fifth configuration of the multi-configuration mechanical apparatus of FIG. 1.

DETAILED DESCRIPTION

Figure 1:
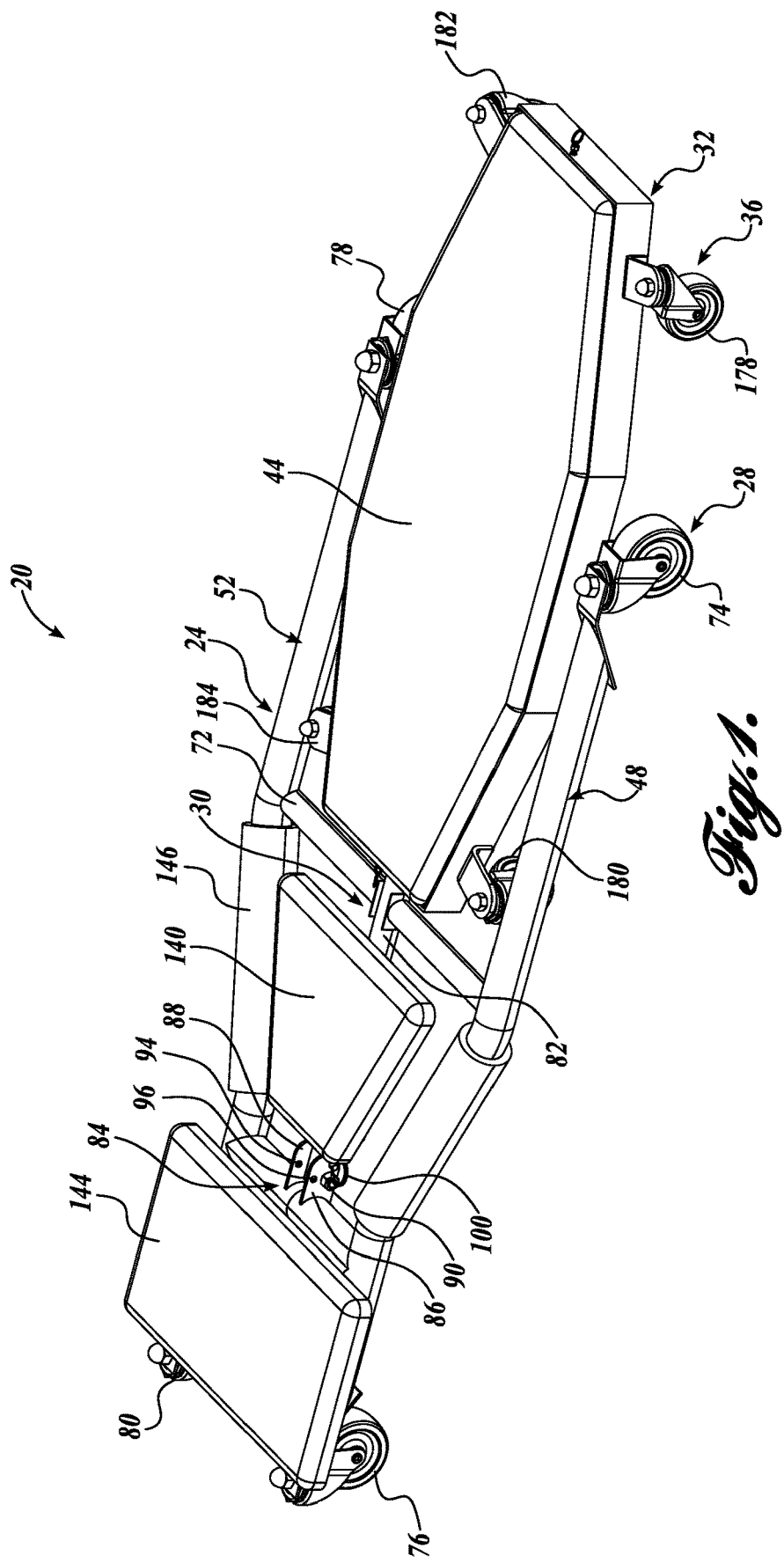
FIG. 1 is an isometric view of an exemplary embodiment of a multi-configuration mechanical apparatus shown in a first configuration.
Figure 2:
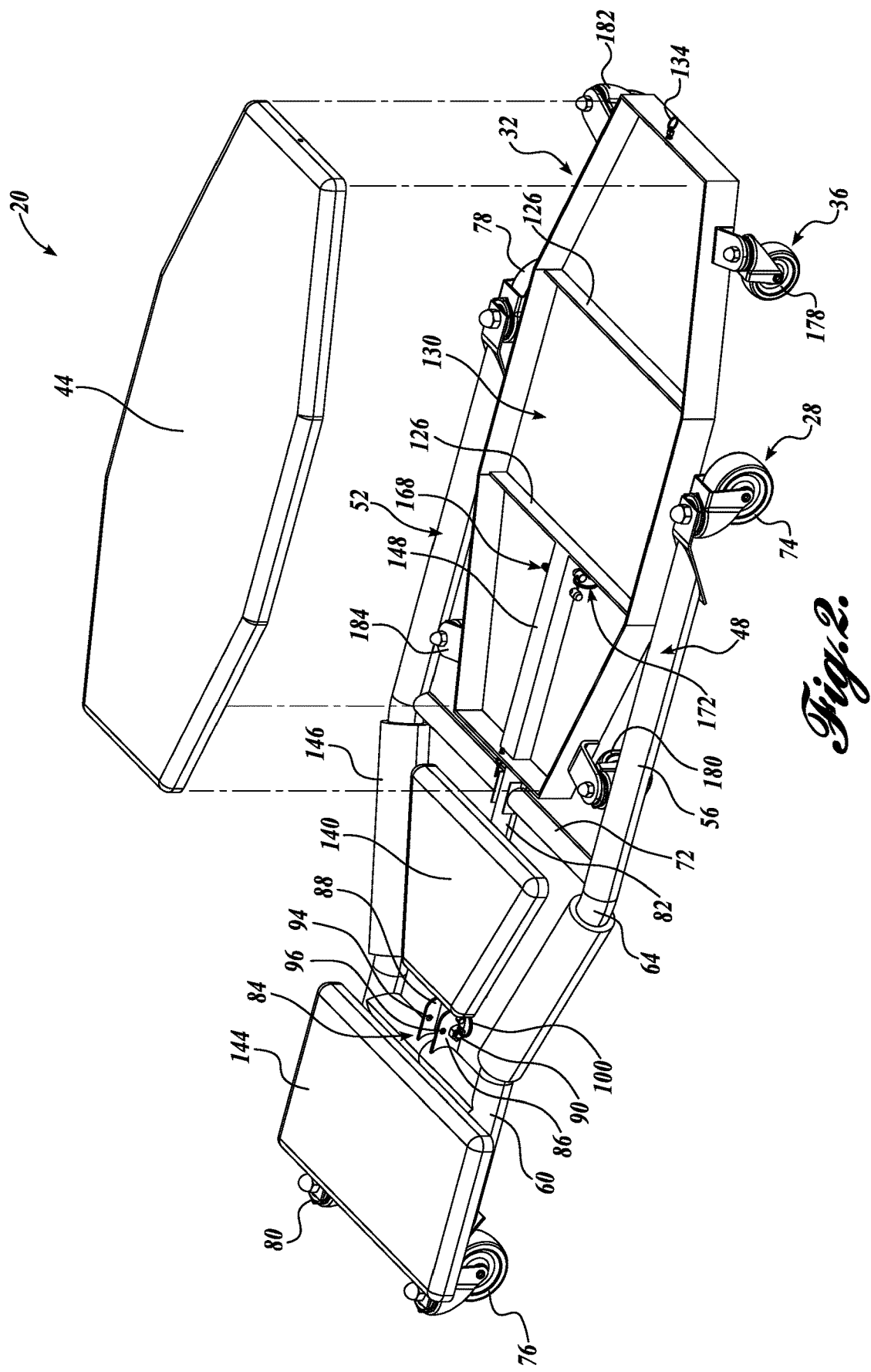
FIG. 2 is an isometric, partially exploded view of a second configuration of the multi-configuration mechanical apparatus of FIG. 1.

A multi-configuration mechanical apparatus 20 formed in accordance with the present disclosure may be seen by referring to FIGS. 1-6. In the embodiments shown and described herein, the multi-configuration mechanical apparatus is embodied as a multi-configuration creeper; and therefore, the multi-configuration mechanical apparatus 20 will be hereinafter referred to as a multi-configuration creeper 20. However, it should be appreciated that the apparatus may instead be configured for other uses. Accordingly, the descriptions and illustrations provided herein should not be seen as limiting the scope of the claimed subject matter.

Referring to FIGS. 1-6, a first exemplary embodiment of the multi-configuration creeper 20 will now be described in detail. The multi-configuration creeper 20 is generally configured to be transformed between at least six different configurations such that it may be used for various different applications. In general, the multi-configuration creeper 20 includes a first frame assembly 24 positionable in a first plane, a first wheel assembly 28 secured to the first frame assembly 24 such that the first frame assembly 24 is moveable along a surface (such as a shop floor), a second frame assembly 30 moveably secured to the first frame assembly 24, and a third frame assembly 32 detachably secured to the second frame assembly 30 that is moveable between at least a first configuration to move the third frame assembly 32 into a substantially coplanar relationship with the first plane (see FIG. 1), and a second configuration to move the third frame assembly 32 in a raised configuration relative to the first frame assembly 24 and in a second plane that is substantially parallel to the first plane (see FIG. 3). The third frame assembly 32 includes a second wheel assembly 36 such that it is moveable with the first frame assembly 24 in the first configuration and such that it is moveable independently when detached from the second frame assembly 30. In addition, a body support pad 44 is removably secured to the third frame assembly 32 such that it may be transformed into a raised or rolling tool tray. These above-described features of the multi-configuration creeper 20, as well as other features, will become appreciated from the detailed description that follows.

Referring to FIGS. 1-4, the first frame assembly 24 will first be described in detail. The first frame assembly 24 includes a first lateral frame member 48 in a spaced substantially parallel relationship to a second lateral frame member 52. The first and second lateral frame members 48 and 52 are of any suitable configuration (cross-sectional shape, length, material, etc.) suitable for the intended application. In the depicted embodiment, the first and second lateral frame members 48 and 52 are substantially identical in shape and size and mirror one another in their configuration. In that regard, only the first lateral frame member 48 will be described in detail.

The first lateral frame member 48 is defined by an elongated tubular structure, optionally having a hollow interior, made from a suitably durable yet sufficiently lightweight material such as aluminum. The elongated tubular structure of the first lateral frame member 48 has a first, leg portion 56 extending from a first end, a second, head portion 60 extending from a second end, and a third, body portion 64 extending at an angle between the leg portion 56 and the head portion 60. In that regard, the planar distance between the first and second lateral frame members 48 and 52 may be narrower between the head portions 60 than between the leg portions 56 with the first and second lateral frame members 48 and 52 defining the first frame assembly 24.

The first and second lateral frame members 48 and 52 are secured together with at least one cross-member or other suitable structure. In the depicted embodiment, a first cross-member 68 extends between the first and second lateral frame members 48 and 52 near the intersection of the leg portion 56 and the body portion 64, and a second cross-member 72 extends between the first and second lateral frame members 48 and 52 near the intersection of the body portion 64 and the head portion 60. The first and second cross-members 68 and 72 may be secured to the first and second lateral frame members 48 and 52 in any suitable manner, such as by welding. It should be appreciated that the first frame assembly 24 may instead be defined by any other structure and material suitable for the intended application.

As noted above, the first frame assembly 24 is moveable along a surface (such as a shop floor) with a first wheel assembly 28. In the depicted embodiment, the first wheel assembly 28 includes a first wheel 74 secured to the first end of the first lateral frame member 48, a second wheel 76 secured to the second end of the first lateral frame member 48, a third wheel 78 secured to the first end of the second lateral frame member 52, and a fourth wheel 80 secured to the second end of the second lateral frame member 52. The wheels 74, 76, 78, and 80 are journaled for rotation at the respective ends of the first and second lateral frame members 48 and 52 through any suitable mounting bracket or the like.

Referring still to FIGS. 1-4, the second frame assembly 30, which is configured to moveably secure the third frame assembly 32 to the first frame assembly 24, will now be described in detail. The second frame assembly 30, similar to the first frame assembly 24, may be made from an elongated tubular member 82 that is optionally hollow, and that is made of a material that is suitably durable yet sufficiently lightweight, such as aluminum. The first end of the elongated tubular member 82 is hingedly coupled to the second cross member 72 through a suitable first hinge assembly 84. Any suitable first hinge assembly 84 that allows the elongated tubular member 82 to move between a first configuration, wherein the elongated tubular member 82 is substantially co-planar with the first and second lateral frame members 48 and 52 (see FIGS. 1 and 2), and a second configuration, wherein the elongated tubular member 82 is substantially transverse to the first and second lateral frame members 48 and 52 (see FIG. 3) may be used.

In the depicted embodiment, the first hinge assembly 84 is defined by first and second lugs 86 and 88 extending from the second cross member 72, wherein the elongated tubular member 82 is moveably secured between the first and second lugs 86 and 88 by a hinge bolt 90 extending therethrough. The elongated tubular member 82 is moved about the pivot axis defined by the hinge bolt 90 between the first and second configurations.

A suitable first locking assembly may be used to selectively lock the elongated tubular member 82 in the first or second configuration. In the depicted embodiment, the first and second lugs 86 and 88 include first and second pin holes 94 and 98 configured to removably receive a pin 100 for securing the elongated tubular member 82 in the first or second configuration. More specifically, to secure the elongated tubular member 82 in the first, lowered configuration, the pin 100 passes through the first pin hole 94 in the first lug 86, through an opening (not shown) in the bottom end of the elongated tubular member 82, and through the first pin hole 94 in the second lug 88. In the first configuration, the elongated tubular member 82 is substantially co-planar with the first and second lateral frame members 48 and 52 (see FIGS. 1, 2, and 4).

To secure the elongated tubular member 82 in the second, raised configuration, the pin 100 passes through the second pin hole 98 in the first lug 86, through the opening in the bottom end of the elongated tubular member 82, and through the second pin hole 98 in the second lug 88. In the second configuration, the elongated tubular member 82 is substantially transverse to the first and second lateral frame members 48 and 52 (see FIG. 3). In that regard, the first and second pin holes 94 and 98 are located at a substantially zero degree (0°) and ninety degree (90°) position relative to the hinge bolt 90.

The pin 100 may be of any suitable configuration such that it is removably securable in the lugs 86/88 and elongated tubular member 82. For instance, the pin 100 may be configured as a cotter pin (e.g., a split cotter pin, a hairpin cotter pin, a bowtie cotter pin, a circle cotter pin, a self-locking implanted cotter pin), a wedge or taper pin, a clevis pin (with a hole or groove), a ball knob detent pin, a ball lock pin, a detent clevis pin, a wire or tab lock pin, a pull ring detent pin, etc., such as any suitable pin, cotter, or ring available from Pivot Point Inc. of Hustisford, Wis. In the depicted embodiment, the pin 100 is configured as a pull ring detent pin having a ball detent that depresses and springs up to hold the pin 100 in place. The pin 100 may be removed by depressing the ball detent and sliding the pin out.

The elongated tubular member 82 is sufficiently long to position at least a portion of the third frame assembly 32 between the leg portions 56 of the first frame assembly 24 when in the first configuration. In that regard, the elongated tubular member 82 extends past the second cross member 72, which includes a correspondingly-shaped cavity or receptacle 104 defined therein for receiving the elongated tubular member 82. The receptacle 104 may be defined within the second cross member 72 in any suitable manner, such as by securing a U-shaped bracket 108 (by welding or the like) between first and second portions 112 and 116 of the second cross member 72. The receptacle 104 may instead be defined by stamping, molding, etc.

With the elongated tubular member 82 received within the receptacle 104, the second frame assembly 30 is substantially prevented from moving laterally with respect to the first frame assembly 24. The receptacle 104 also helps support the elongated tubular member 82 in this first, lowered configuration, especially if supporting a user's weight or the like. In that regard, an additional support member(s) 102 may be provided on the bottom surface of the elongated tubular member 82 to help prevent the elongated tubular member 82 from bending or otherwise deforming under the weight of a user, machine, etc.

With the elongated tubular member 82 received within the receptacle 104, the elongated tubular member 82 is also substantially co-planar with the first and second lateral frame members 48 and 52 of the first frame assembly 24. In that regard, the elongated tubular member 82 is also receivable within an correspondingly-shaped elongated tubular member receptacle 148 of the third frame assembly 32 such that the third frame assembly 32 is also substantially co-planar with the first and second lateral frame members 48 and 52 in the first, lowered (and collapsed) configuration. The elongated tubular member receptacle 148 may be defined by an elongated, open rectangular structure formed the third frame assembly 32, or any other suitable structure. In that regard, with the elongated tubular member 82 received within the elongated tubular member receptacle 148, the third frame assembly 32 is substantially prevented from moving laterally with respect to the second frame assembly 28. This "nesting" arrangement of the first, second, and third frame assemblies 24, 28, and 32 results in a stable, compact first configuration.

Figure 3:
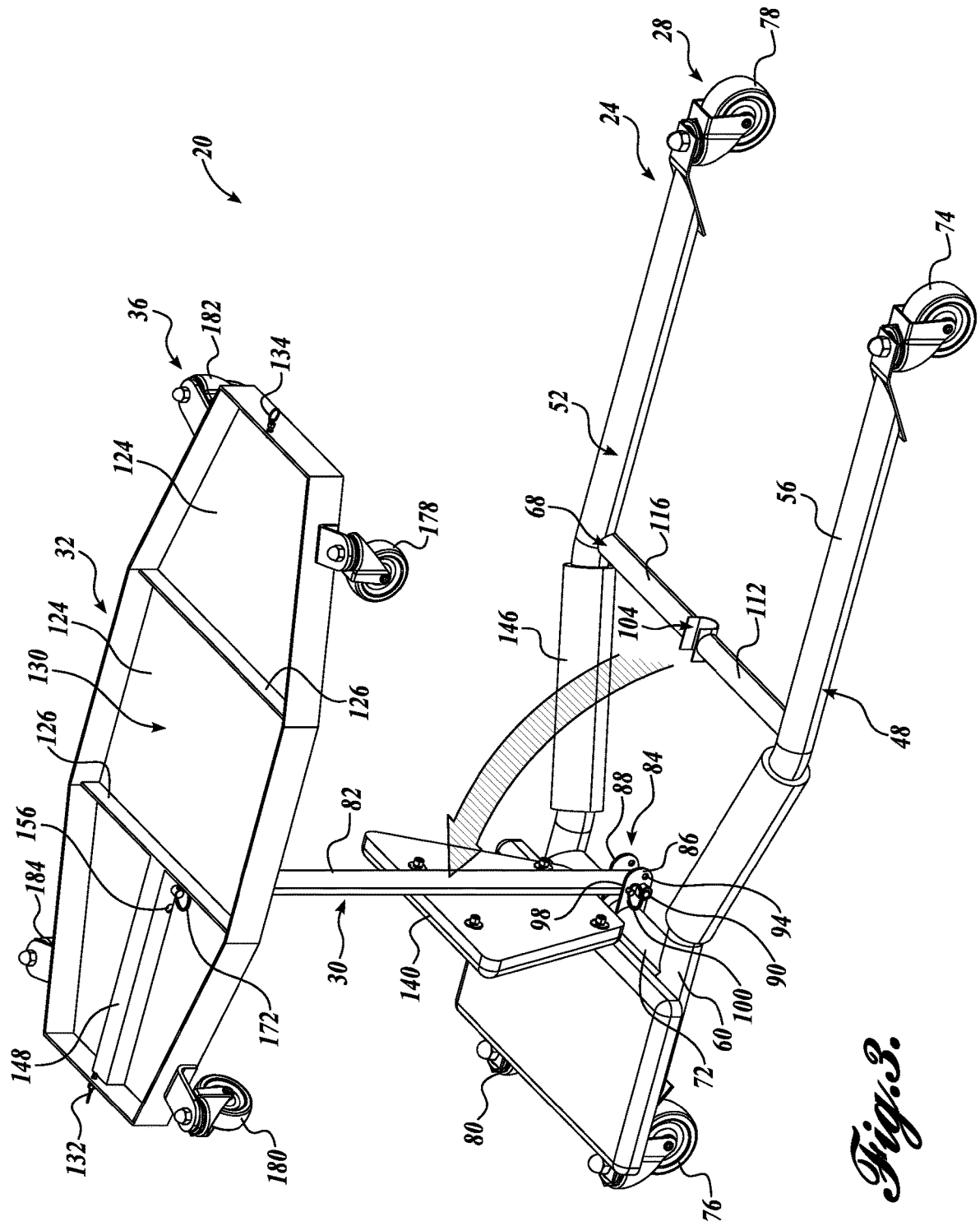
FIG. 3 is an isometric view of a third configuration of the multi-configuration mechanical apparatus of FIG. 1.
Figure 4:
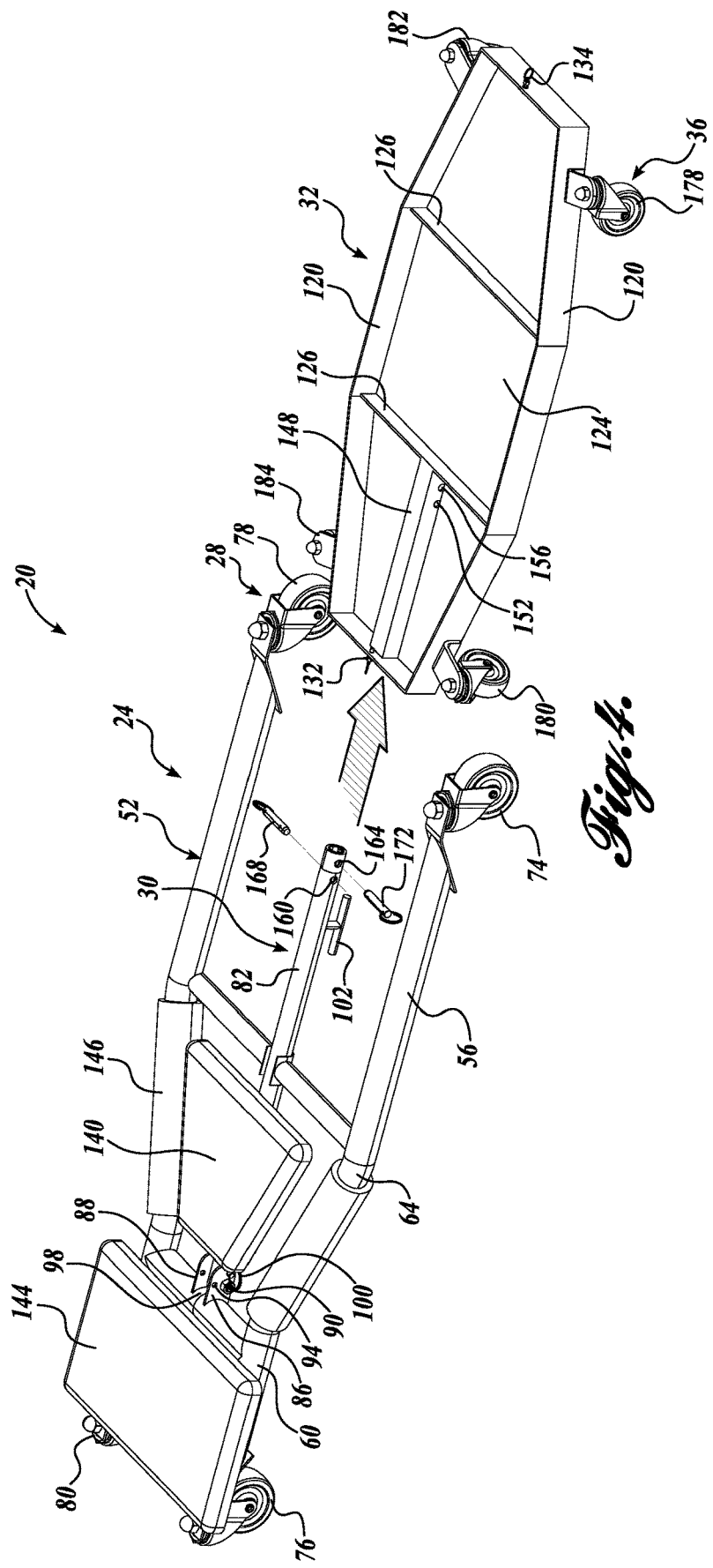
FIG. 4 is an isometric view of a fourth configuration of the multi-configuration mechanical apparatus of FIG. 1.
Figure 5:
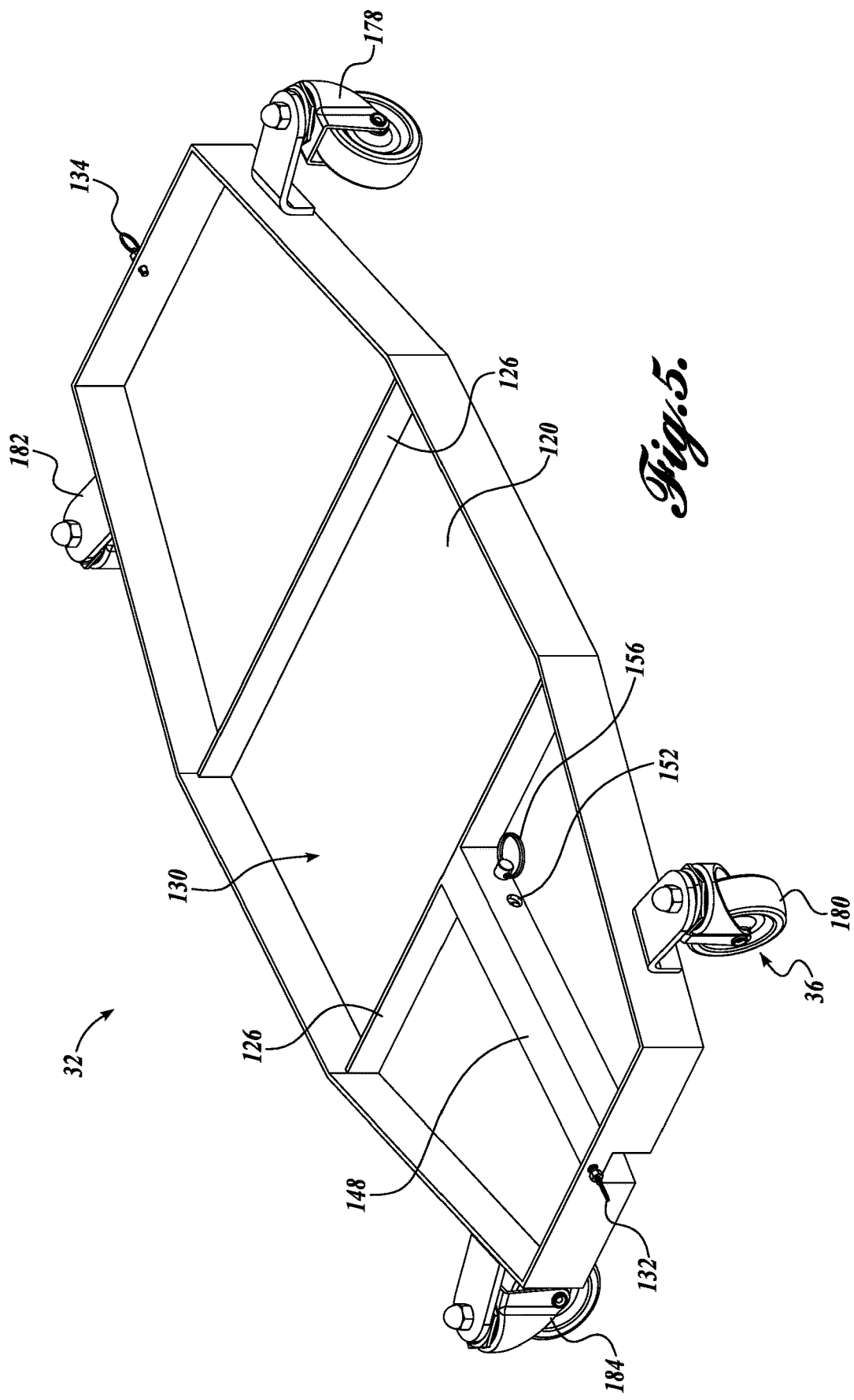
FIG. 5 is an isometric view of a fifth configuration of the multi-configuration mechanical apparatus of FIG. 1.

The third frame assembly 32, which is detachably and moveably secured to the second frame assembly 30, will now be described. Referring to FIGS. 1-6, the third frame assembly 32 is of a suitable shape, size, and configuration to support a portion of a user's body, equipment, etc., in the second, lowered configuration (FIG. 1), and to define a tool tray or other supportive feature in the raised configuration (FIG. 3). Although any suitable shape, size, and configuration may be used, the exemplary third frame assembly 32 is defined by an elongated (suitably body-shaped) frame wall 120 extending around the perimeter of and extending upwardly from a base 124, with at least one cross frame member 126 extending between opposite sides of the frame wall 120. The elongated tubular member receptacle 148 extends upwardly from the base 124 (opening on the bottom surface) and between a first end of the frame wall 120 and a cross-member 126. The wall 120, base 124, elongated tubular member receptacle 148, and cross frame member(s) 126 may be made from a suitable material, such as metal or plastic, and may be independently made and thereafter secured together (such as by welding), or formed as an integral part by molding or otherwise.

The cross-member 126 at which the elongated tubular member receptacle 148 terminates may be located at about one-third (⅓) of the length of the third frame assembly 32. In this manner, when the third frame assembly 32 is pivoted about the end of the elongated tubular member 82 into the raised configuration, as shown in FIG. 3, the third frame assembly 32 is urged into a substantially horizontal table-like configuration. In other words, an off-center second hinge assembly 150 (not yet labeled in the FIGURES) is defined between the distal end of the elongated tubular member 82 and the third frame assembly 32 such that the weighted, elongated cantilevered portion of the third frame assembly 32 urges the third frame assembly 32 into a horizontal configuration as it is moved into the second, raised configuration.

The second hinge assembly 150 may be any suitable configuration such that the third frame assembly 32 moves between the lowered and raised configurations when the elongated tubular member 82 moves between the first and second configurations. More specifically, the third frame assembly 32 is hingedly connected to an upper end of the elongated tubular member 82 such that when it is moved into the raised configuration, the third frame assembly 32 pivots about an axis defined by the second hinge assembly 150 to remain in a substantially horizontal configuration (i.e., substantially parallel to the plane of the first frame assembly 24), as shown in FIG. 3. Along the same lines, the third frame assembly 32 is hingedly connected to the upper end of the elongated tubular member 82 such that when it is moved into the lowered configuration, the third frame assembly 32 pivots about the axis defined by the second hinge assembly 150 to remain in the substantially horizontal configuration (i.e., substantially parallel to the plane of the first frame assembly 24) and collapse within the first frame assembly 24, as shown in FIG. 1.

In the depicted embodiment best seen by referring to FIGS. 2-5, the second hinge assembly 150 is defined by a first pin 172 receivable within aligned first receptacle pin holes 156 (only one shown) defined in opposite walls of the U-shaped structure defining the elongated tubular member receptacle 148. When the elongated tubular member 82 is disposed within the elongated tubular member receptacle 148, the first pin 172 may pass through the first receptacle pin hole 156 in a first wall of the elongated tubular member receptacle 148, through an aligned first opening(s) 164 in the distal end of the elongated tubular member 82, and through the first receptacle pin hole 156 in a second wall of the elongated tubular member receptacle 148. In other words, the first pin 172 extends transversely through the elongated tubular member receptacle 148 and the elongated tubular member 82 to hingedly secure the distal end of the elongated tubular member 82 to the third frame assembly 24. As such, the third frame assembly 24 may be moved about the pivot axis defined by the first pin 172 to remain substantially horizontal in the first and second configurations.

A suitable second locking assembly may be used to selectively lock the third frame assembly 24 in a substantially horizontal position when the elongated tubular member 82 is in the first or second configuration. In the depicted embodiment, the second locking assembly is defined by a second pin 168 receivable within aligned second receptacle pin holes 152 (only one shown) defined in opposite walls of the U-shaped structure defining the elongated tubular member receptacle 148, as well as an aligned second opening(s) 160 in the distal end of the elongated tubular member 82 located between the first aligned opening(s) 164 and the second hinge assembly. More specifically, when the elongated tubular member 82 is disposed within the elongated tubular member receptacle 148, the second pin 168 may pass through the second receptacle pin hole 152 in a first wall of the elongated tubular member receptacle 148, through an aligned opening(s) 160 in the distal end of the elongated tubular member 82, and through the second receptacle pin hole 152 in a second wall of the elongated tubular member receptacle 148. When received within the elongated tubular member receptacle 148 and the elongated tubular member 82, the second pin 168 prevents the distal end of the elongated tubular member 82 from moving about the pivot axis defined by the first pin 172.

The third frame assembly 32 is also detachable from the second frame assembly 30 such that the third frame assembly 32 may be used independently as a smaller creeper, rolling tool tray, etc. In that regard, the first and second pins 172 and 168 are removably securable within the first and second pin holes 156 and 152 and first and second opening(s) 164 and 160 in the elongated tubular member receptacle 148 and the elongated tubular member 82, respectively. The pins 156 and 152 may be of any suitable configuration such that they are removably securable in the elongated tubular member receptacle 148 and the elongated tubular member 82. For instance, the pins 156 and 152 may be the same configuration as pin 100 or any of the other configurations described above.

The third frame assembly 32 includes a second wheel assembly 36 such that it may be moveable along a surface (such as a shop floor) when detached. In the depicted embodiment, the second wheel assembly 36 includes first, second, third, and fourth wheels 178, 180, 182, and 184 secured near first, second, third, and fourth corners, respectively of the third frame assembly 32. The wheels 178, 180, 182, and 184 are journaled for rotation at the respective corners of the third frame assembly 32 through any suitable mounting bracket or the like.

Depending on the intended use of the multi-configuration creeper 20, the body support pad 44 may be removed from the third frame assembly 32 to reveal a tool receptacle 130 defined by the frame wall 120 and base 124. The body support pad 44 may be removably secured within the tool receptacle 130 through one or more pins having the same configuration as pin 100 or any of the other configurations described above. In the depicted embodiment, first and second pad pins 132 and 134 are passed through first and second ends of the frame wall 120 and the body support pad 44, respectively, to removably secure the body support pad 44 within the tool receptacle 130. The body support pad 44 may instead be removably secured within the tool receptacle 130 in any other suitable manner, such as by a friction or interference fit, a snap fit, etc.

As noted above, the body support pad 44 may be removed or secured within the third frame assembly 32 depending on the intended use of the third frame assembly 32. For instance, the body support pad 44 may be removed from the third frame assembly 32 when the third frame assembly 32 is moved into the raised configuration such that the third frame assembly 32 may be used as a raised tool tray (see FIG. 3). Moreover, the body support pad 44 may be removed from the third frame assembly 32 when the third frame assembly 32 is detached from the second frame assembly 30 to function as a rolling tool tray (see FIG. 5).

In other configurations, the body support pad 44 may be secured within the third frame assembly 32 to support the body of a user, equipment, etc., in a creeper configuration. For instance, the body support pad 44 may be secured within the third frame assembly 32 when the third frame assembly 32 is secured to the second frame assembly 32 in the first, lowered configuration, as shown in FIG. 1. In such a configuration, the third frame assembly 32, together with the body support pad 44, may define a long creeper suitable for supporting the body, shoulders/back, and head of a user. In that regard, a back support or pad 140 may be secured to the elongated tubular member 82 and a head support or pad 144 may be secured to the head portions 60 of the first and second lateral frame members 48 and 52 to provide support for the shoulders/back and head of a user in the supine position. Fewer, more, or different support pads (such as lateral frame member coverings 146) may be secured to the first, second, and/or third frame assemblies to provide suitable support and/or comfort for the user's body in the supine position.

The body support pad 44 may also be secured within the third frame assembly 32 when it is detached from the second frame assembly 32, as shown in FIG. 6. In such a configuration, the third frame assembly 32, together with the body support pad 44, defines a small creeper suitable for supporting a portion of the body, equipment, etc.

It should be appreciated from the foregoing that the multi-configuration creeper 20 may be configured for a variety of uses with minimal effort and required storage space.

The detailed description set forth above in connection with the appended drawings is intended as a description of exemplary embodiments of the disclosed subject matter and is not intended to represent the only embodiments. The exemplary embodiments described in this disclosure are provided merely as examples or illustrations of a multi-configuration apparatus, such as a creeper, and should not be construed as preferred or advantageous over other embodiments. The illustrative examples provided herein are not intended to be exhaustive or to limit the disclosure to the precise forms disclosed. Similarly, any features and/or process steps described herein may be interchangeable with other features and/or process steps, or combinations of features and/or process steps, in order to achieve the same or substantially similar result.

In the foregoing description, numerous specific details are set forth in order to provide a thorough understanding of the exemplary embodiment of the present disclosure. It will be apparent to one skilled in the art, however, that many embodiments of the present disclosure may be practiced without some or all of the specific details. In some instances, well-known features, subassemblies, and/or process steps have not been described in detail in order not to unnecessarily obscure various aspects of the present disclosure. Further, it will be appreciated that embodiments of the present disclosure may employ any combination of features described herein. For instance, any feature or configuration described above with respect to the core may be adapted for use with the cover, and vice versa.

Although certain descriptive terms are used to illustrate or describe certain aspects or benefits of the present invention, they should not be seen as limiting. For instance, although the term "creeper" is used, it should be appreciated that the multi-configuration apparatus 20 described and illustration herein may also be used for other uses not mentioned.

The present disclosure also includes references to directions, such as "vertical", "horizontal," "proximal," "distal," "upper," "lower," "upward," "downward," "top," "bottom," "first," "second," etc. These references and other similar references in the present disclosure are only to assist in helping describe and understand the exemplary embodiments and are not intended to limit the claimed subject matter to these directions.

The present disclosure may also reference quantities and numbers. Unless specifically stated, such quantities and numbers are not to be considered restrictive, but exemplary of the possible quantities or numbers associated with the present disclosure. Also in this regard, the present disclosure may use the term "plurality" to reference a quantity or number. In this regard, the term "plurality" is meant to be any number that is more than one, for example, two, three, four, five, etc. The terms "substantially," "about," "approximately," etc., mean plus or minus 5% of the stated value.

While illustrative embodiments have been illustrated and described, it will be appreciated that various changes can be made therein without departing from the spirit and scope of the invention.

The embodiments of the invention in which an exclusive property or privilege is claimed are defined as follows:

1. A multi-configuration apparatus, comprising:
a first frame assembly positionable in a first plane;
wheels secured to the first frame assembly such that the first frame assembly is moveable along a surface;
a second frame assembly moveably secured to the first frame assembly;
a third frame assembly detachably secured to the second frame assembly, wherein the second frame assembly is moveable between at least a first configuration to move the third frame assembly into a substantially coplanar relationship with the first plane, and a second configuration to move the third frame assembly in a raised configuration relative to the first frame assembly and in a second plane that is substantially parallel to the first plane;
a support secured to the third frame assembly; and
wheels secured to the third frame assembly such that the third frame assembly is moveable along a surface when the third frame assembly is detached from the second frame assembly.

2. The apparatus of claim 1, wherein the body support is removably secured to the third frame assembly.

3. The apparatus of claim 2, further comprising a tool tray portion defined on the third frame assembly beneath the body support.

4. The apparatus of claim 1, wherein the second frame assembly is hingedly secured to the first frame assembly with a first hinge assembly, and the third frame assembly is hingedly secured to the second frame assembly with a second hinge assembly.

5. The apparatus of claim 4, further comprising a first locking assembly configured to prevent the second frame assembly from pivoting about an axis defined by the first hinge assembly.

6. The apparatus of claim 5, wherein the first locking assembly is defined by a pin removably receivable within the first and second frame assemblies.

7. The apparatus of claim 4, further comprising a second locking assembly configured to prevent the third frame assembly from pivoting about an axis defined by the second hinge assembly.

8. The apparatus of claim 7, wherein the second locking assembly is defined by a pin removably receivable within the second and third frame assemblies.

9. The apparatus of claim 4, further comprising:
a first locking assembly configured to prevent the second frame assembly from pivoting about an axis defined by the first hinge assembly; and
a second locking assembly configured to prevent the third frame assembly from pivoting about an axis defined by the second hinge assembly.

10. The apparatus of claim 1, wherein the second support frame assembly is defined by an elongated member that is hinged at its first end to the first frame assembly and hinged at its second end to the third frame assembly.

11. The apparatus of claim 10, wherein the elongated member is received within a receptacle defined in the first frame assembly and within a receptacle defined in the third frame assembly when the second frame assembly is in the first configuration.

12. The apparatus of claim 11, wherein the second frame assembly is substantially prevented from moving laterally relative to the first frame assembly when the second frame assembly is in the first configuration.

13. The apparatus of claim 12, wherein the third frame assembly is substantially prevented from moving laterally relative to the second frame assembly when the second frame assembly is in the first configuration.

14. The apparatus of claim 1, wherein the third frame assembly is detachably secured to the second frame assembly with at least one pin.

15. A multi-configuration creeper, comprising:
a first frame assembly positionable in a first plane;
wheels secured to the first frame assembly such that the first frame assembly is moveable along a surface;
a second frame assembly moveably secured to the first frame assembly;
a third frame assembly detachably secured to the second frame assembly, wherein the second frame assembly is moveable between at least a first configuration to move the third frame assembly into a substantially coplanar relationship with the first plane, and a second configuration to move the third frame assembly in a raised configuration relative to the first frame assembly and in a second plane that is substantially parallel to the first plane;
a body support secured to the third frame assembly; and
wheels secured to the third frame assembly such that the third frame assembly is moveable along a surface when the third frame assembly is detached from the second frame assembly.

16. The creeper of claim 15, wherein the second frame assembly is hingedly secured to the first frame assembly with a first hinge assembly, and the third frame assembly is hingedly secured to the second frame assembly with a second hinge assembly.

17. The creeper of claim 16, further comprising a first locking assembly configured to prevent the second frame assembly from pivoting about an axis defined by the first hinge assembly.

18. The creeper of claim 16, further comprising a second locking assembly configured to prevent the third frame assembly from pivoting about an axis defined by the second hinge assembly.

19. The creeper of claim 16, wherein the second frame assembly is received within a receptacle defined in the first frame assembly and within a receptacle defined in the third frame assembly when the second frame assembly is in the first configuration.

20. The creeper of claim 19, wherein the second frame assembly is substantially prevented from moving laterally relative to the first frame assembly when the second frame assembly is in the first configuration.

* * * * *